US 9,875,589 B1

(12) United States Patent
Buttolo et al.

(10) Patent No.: US 9,875,589 B1
(45) Date of Patent: Jan. 23, 2018

(54) VEHICLE ACCESS AUTHENTICATION

(71) Applicant: FORD GLOBAL TECHNOLOGIES, LLC, Dearborn, MI (US)

(72) Inventors: Pietro Buttolo, Dearborn Heights, MI (US); James Stewart Rankin, II, Novi, MI (US); Mengchi Wang, Dearborn, MI (US); Stuart C. Salter, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/278,868

(22) Filed: Sep. 28, 2016

(51) Int. Cl.
*G07C 9/00* (2006.01)
*G08G 1/123* (2006.01)
*H04W 4/02* (2009.01)

(52) U.S. Cl.
CPC ...... *G07C 9/00111* (2013.01); *G07C 9/00309* (2013.01); *G08G 1/123* (2013.01); *H04W 4/02* (2013.01); *G07C 2009/00412* (2013.01); *G07C 2009/00769* (2013.01)

(58) Field of Classification Search
CPC ........... G07C 9/00111; G07C 9/00309; G08G 1/123; H04W 4/02
See application file for complete search history.

(56) References Cited

U.S. PATENT DOCUMENTS

| 8,880,239 B2 | 11/2014 | Kleve et al. |
| 9,208,305 B2 | 12/2015 | Bjorn |
| 2014/0156110 A1 | 6/2014 | Ehrman |
| 2016/0203661 A1* | 7/2016 | Pudar ............ B60R 25/24 340/5.25 |

* cited by examiner

*Primary Examiner* — Leon Flores
(74) *Attorney, Agent, or Firm* — Jennifer Stec; Brooks Kushman P.C.

(57) ABSTRACT

Responsive to location information received from a positioning system indicating a vehicle location corresponding to a predefined location, a controller of a vehicle broadcasts a notification including the vehicle location. Responsive to receiving a request including a device location from a mobile device having interpreted the broadcast, the controller permits access to the vehicle responsive to a difference between the device location and the vehicle location being less than a predefined threshold distance.

20 Claims, 6 Drawing Sheets

VEHICLE ACCESS AUTHENTICATION

TECHNICAL FIELD

The present disclosure relates to systems and methods for authenticating a mobile device for granting access to a vehicle.

BACKGROUND

When a driver, or other user in possession of a passive entry device, approaches a vehicle, a short-range signal from the passive entry device authenticates the user to unlock one or more vehicle doors. Some passive entry systems may also provide for automated locking of doors, as the keyless entry device leaves proximity of the vehicle.

SUMMARY

A system includes a controller of a vehicle, configured to responsive to location information received from a positioning system indicating a vehicle location corresponding to a predefined location, broadcast a notification including the vehicle location, and responsive to receiving a request including a device location from a mobile device having interpreted the broadcast, permit access to the vehicle responsive to a difference between the device location and the vehicle location being less than a predefined threshold distance.

A method for a vehicle includes, responsive to a positioning system indicating a vehicle location corresponding to an established pick-up location, broadcasting an encrypted combination of a vehicle identifier and a vehicle location, and, responsive to receiving an encrypted request including both a device identifier and a device location from a mobile device having decrypted the broadcast, decrypting the request and permitting access to the vehicle responsive to the device location being within a predefined threshold distance to the pick-up location.

A system includes a mobile device configured to responsive to receiving, from a vehicle, a notification indicating that access is available, send to the vehicle an access request including both a device identifier and device location according to location information received from a device positioning system, the location offset using a predefined offset value, and responsive to receiving an access confirmation from the vehicle having interpreted the request, display a confirmation notification.

DETAILED DESCRIPTION

Figure 1:
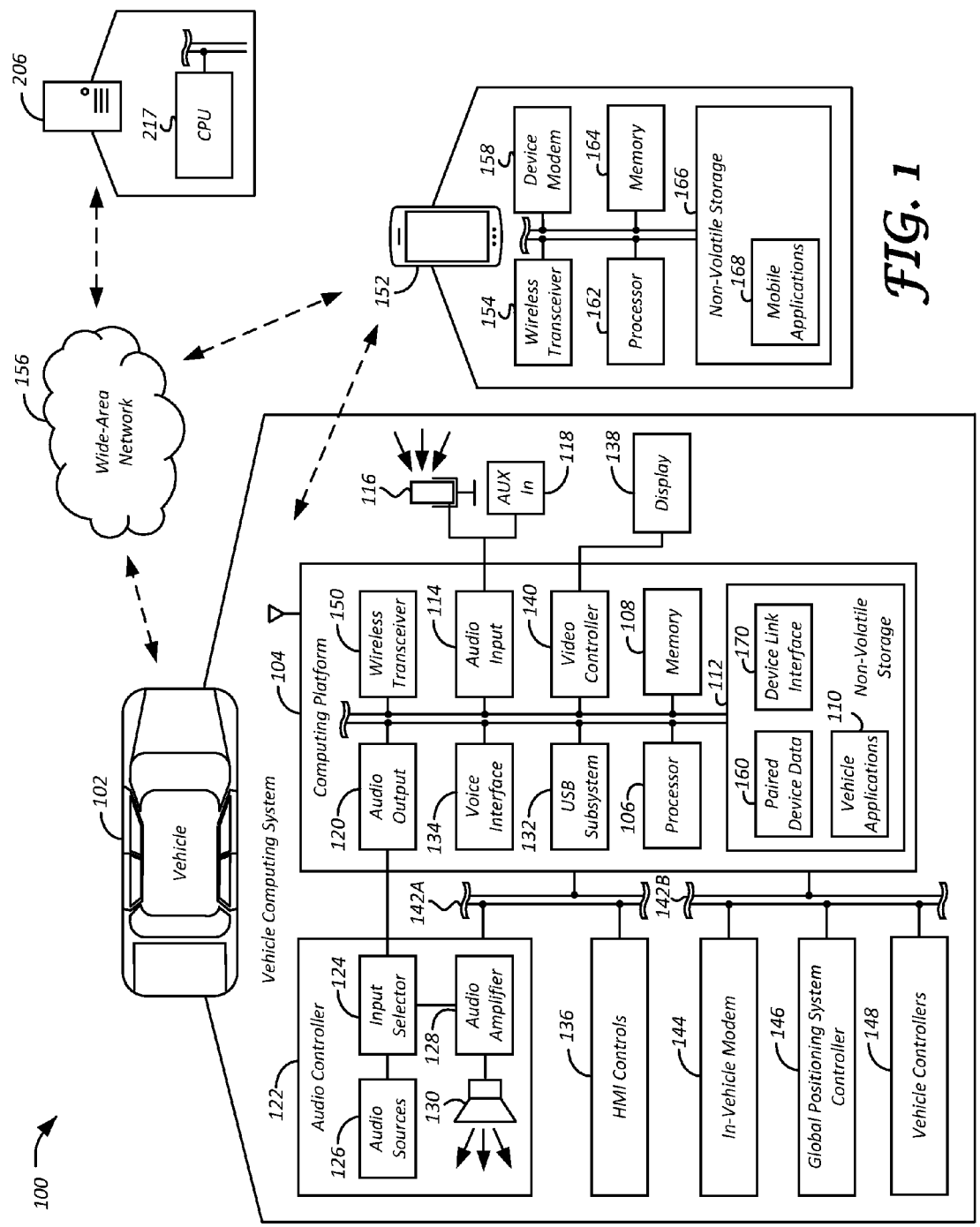
FIG. 1 is a block diagram illustrating a vehicle-based computing platform.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle enhanced with a wireless communication interface (such as BLUETOOTH Low Energy (BLE)) may be in communication with smartphones or other personal devices of the vehicle users. Using the communication interface, the users may wirelessly control one or more in-vehicle components or features, such as door locks, seat positions, mirror and pedal positions, climate control settings, and so on. In an example, the mobile device may request a driver door to the vehicle be unlocked as the user approaches the vehicle. In another example, the mobile device may request that one or more vehicle doors be unlocked based on a seat reserved during a ride-share transaction.

The vehicle may transmit an encrypted broadcast via the communication interface to announce that vehicle access may be available to an authorized user. A mobile device that detects the broadcast may be configured to decrypt the message and use vehicle identifier and vehicle location included within the broadcast to confirm that the detected vehicle access broadcast is from a correct vehicle and that the broadcast is not being transmitted by an illegitimate device in hopes of capturing a reply and submitting to the vehicle to gain unauthorized entry, such as in a relay attack. In an example, the mobile device may confirm that the vehicle identifier included with the detected broadcast corresponds to a vehicle identifier associated with a previously-made transaction. The transaction may be, in an example, a pick-up for a ride share. The mobile device may, in another example, confirm that vehicle location included in the broadcast is located within a predefined distance threshold of the mobile device.

In response to the broadcast, the mobile device may request access to the vehicle using an encrypted broadcast including a mobile device identifier and current location of the device. Upon confirmation that the mobile device identifier corresponds to the identifier associated with the current transaction and that the location of the device is within a predefined distance threshold of the vehicle, the vehicle may grant access to the user in possession of the mobile device.

In response to determining that the detected broadcast or access request include a location outside the distance threshold, the vehicle and the mobile device may send a notification indicating that the detected transmissions are being falsified or otherwise manipulated.

FIG. 1 illustrates an example diagram of a system 100 that may be used to provide telematics services to a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A computing platform 104 may include one or more processors 106 connected with both a memory 108 and a computer-readable storage medium 112 and configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be further configured to communicate with other components of the vehicle 102 via one or more in-vehicle networks 142. As shown, the computing platform 104 may communicate with a first set of vehicle systems, subsystems, or components over a first in-vehicle network 142A, and with a second set of vehicle 102 systems, subsystems, or components over a second in-vehicle network 142B. In other examples, the computing platform 104 may be connected to more or fewer in-vehicle networks 142. Additionally or alternately, one or more vehicle 102 systems, subsystem, or components may be connected to the computing platform 104 via different in-vehicle networks 142 than shown, or directly, e.g., without connection to an in-vehicle network 142.

The in-vehicle networks 142 may include one or more of a vehicle controller area network (CAN), an Ethernet network, or a media oriented system transfer (MOST), as some examples. The in-vehicle networks 142 may allow the computing platform 104 to communicate with other vehicle 102 systems, such as an in-vehicle modem 144, a global positioning system (GPS) controller 146 configured to provide current vehicle 102 location and heading information, and various vehicle controllers 148 configured to provide other types of information regarding the systems of the vehicle 102. As some non-limiting possibilities, the vehicle controllers 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors, and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

The computing platform 104 of the vehicle 102 may be configured to communicate with one or more mobile devices 152 positioned inside, outside, or within a predefined distance of the vehicle 102. Examples of the mobile devices 152 may include, but are not limited to, cellular phones, tablet computers, smart watches, laptop computers, portable music players, or other portable computing devices capable of communication with the computing platform 104. Similar to the computing platform 104, the mobile device 152 may include one or more processors 162 configured to execute instructions of mobile applications 168 loaded to a memory 164 of the mobile device 152 from storage medium 166.

In some examples, the computing platform 104 may include a wireless transceiver 150 (e.g., one or more of a BLUETOOTH controller, a ZigBee® transceiver, a Wi-Fi transceiver, etc.) configured to communicate with a compatible wireless transceiver 154 of the mobile device 152. In some cases, the mobile devices 152 seeking permission to connect to the computing platform 104 may be identified by the computing platform 104 according to paired device data 160 maintained in the storage medium 112. In other examples, the wireless transceiver 150 of the vehicle 102 and the mobile device 152 may communicate using a BLUETOOTH Low Energy (BLE) network, e.g., the BLUETOOTH controller (an advertiser) of the vehicle 102 may broadcast a notification based, for instance, on a current geographic location of the vehicle 102 and a compatible transceiver (a scanner) of the mobile devices 152 may actively monitor for and process the broadcast upon receipt. An example of an advantage of the advertiser/scanner relationship may be that neither device has to be electronically paired and connected to authorize communication between the devices.

Additionally or alternatively, the computing platform 104 may communicate with the mobile devices 152 via a wide-area network 156 providing communications services, such as packet-switched network services (e.g., Internet access, VoIP communication services), to devices connected to the wide-area network 156. An example of a wide-area network 156 may include a cellular telephone network. The computing platform 104 may, for instance, utilize the in-vehicle modem 144 of the vehicle 102 to connect to the wide-area network 156. Similar to the computing platform 104, the mobile devices 152 may connect to the wide-area network 156 using a device modem 158 of the mobile device 152, such as via associated unique device identifiers (e.g., media access control (MAC) addresses, mobile device numbers (MDNs), Internet protocol (IP) addresses, mobile station international subscriber directory numbers (MSISDNs), international mobile subscriber identity (IMSI), etc.) identifying the communications of the mobile devices 152 over the wide-area network 156. In some examples, the mobile applications 168 may be configured to communicate with the computing platform 104 or other locally-networked devices and with the wide-area network 156.

Via a connection with the wide-area network 156 or via another connection method, the computing platform 104 and the mobile devices 152 may each be in communication with a ride-share transaction server (hereinafter, server) 206 configured to receive a ride-share transaction request from the mobile devices 152 and generate and distribute to the vehicle 102 and the mobile devices 152 one or more encryption keys, vehicle identifiers, mobile device identifiers, and location offset values in association with the request. The server 206 and its components, such as components as described in reference to at least FIG. 1 and FIG. 2, may be provided as software that, when executed by the CPU 217 of the server 206, provides the operations described herein. Alternatively the server 206 and its components may be provided as hardware or firmware, or combinations of software, hardware and/or firmware. Additionally, it should be understood that the operations of the server 206 may be provided by fewer, greater, or differently named components.

The computing platform 104 may also be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a Bluetooth® audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio controller 122. In other examples, the computing platform 104 may provide audio output to the occupants through use of one or more dedicated speakers (not illustrated). The audio controller 122 may include an input selector 124 configured to provide audio content from a selected audio source 126 to an audio amplifier 128 for playback through vehicle speakers 130, as well as, include audio content generated by the computing platform 104, audio content decoded from flash memory drives connected to a universal serial bus (USB) subsystem 132 of the computing platform 104, audio content passed through the computing platform 104 from the auxiliary audio input 118, and so on. The computing platform 104 may utilize a voice interface 134 to provide a hands-free interface to the computing platform 104, as well as, support speech recognition, e.g., from audio received via the microphone 116 according to a grammar of available commands, and voice prompt generation for output via the audio controller 122.

The computing platform 104 may also receive input from human-machine interface (HMI) controls 136 configured to provide for occupant interaction with the vehicle 102, e.g., via one or more buttons or other HMI controls configured to invoke computing platform 104 functions. The computing platform 104 may also drive or otherwise communicate with one or more displays 138 configured to provide visual output to vehicle occupants by way of a video controller 140.

The computing platform 104 may include a device link interface 170 to facilitate the integration of functionality of the mobile applications 168 into the grammar of commands available via the voice interface 134. The device link interface 170 may also provide the mobile applications 168 with access to vehicle features, such as information available to the computing platform 104 via the in-vehicle networks 142 or access to the display 138. An example of a device link interface 170 may be the SYNC APPLINK component of the SYNC system provided by The Ford Motor Company of Dearborn, Mich.

Figure 2:
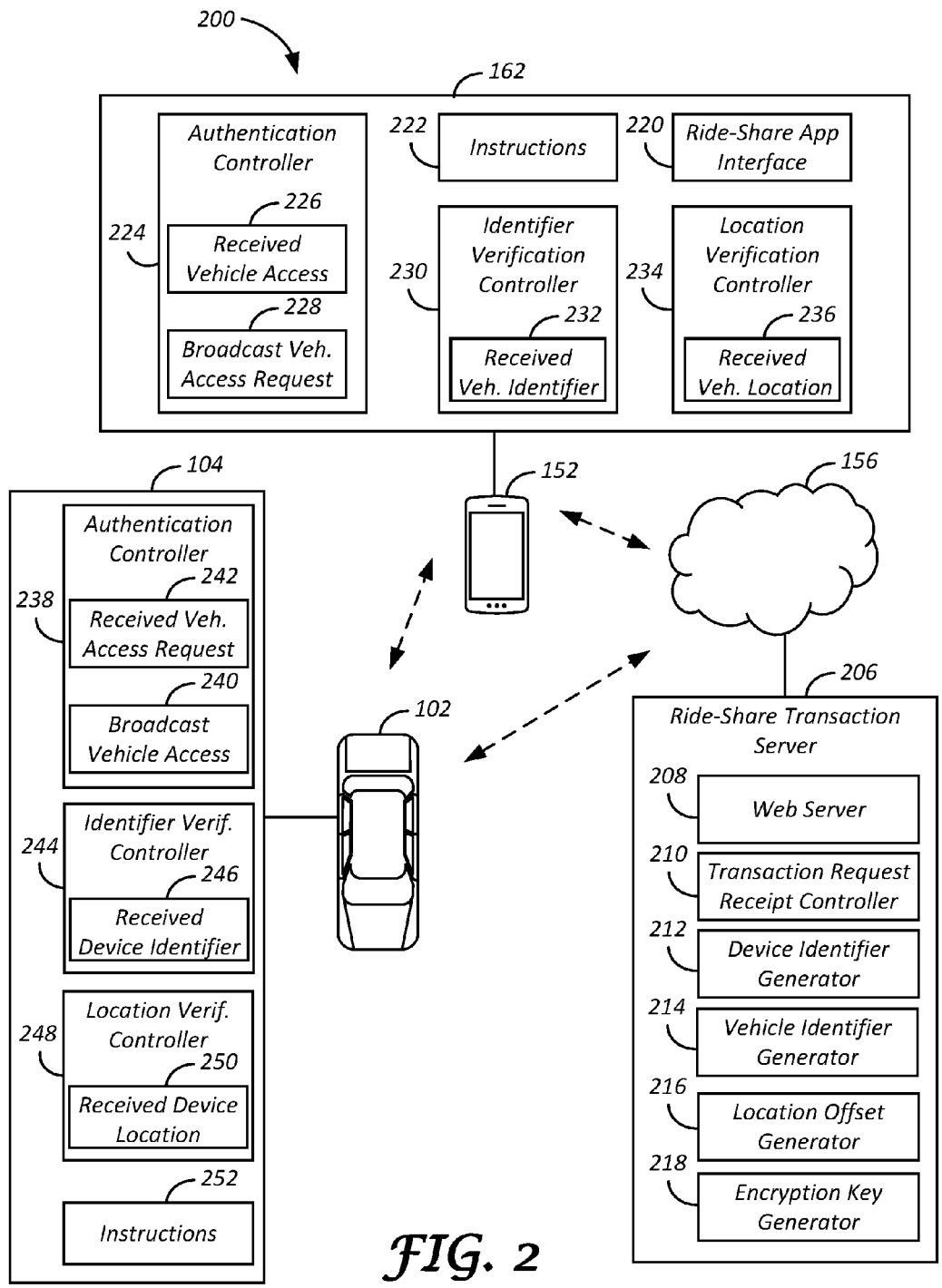
FIG. 2 is a block diagram illustrating generation and distribution of authentication identifiers associated with a ride-share transaction.

Shown in FIG. 2 is an exemplary diagram 200 of the vehicle 102 and the mobile device 152, each in communication over the wide-area network 156 with the server 206. FIGS. 1 and 2 illustrate an example of components of the server 206. As described previously in reference to at least FIG. 1, the server 206 and its components, such as components 208-218, may be provided as software, hardware or firmware, or combinations of software, hardware and/or firmware. Additionally, although one example of the components defining the server 206 is illustrated and described, it should be understood that the operations thereof may be provided by fewer, greater, or differently named components. Likewise, the mobile device 152 and its components, such as components 220-236, may be provided as software that when executed by the processor 162 of the mobile device 152 provides the operations described herein. Alternatively the mobile device 152 and its components may be provided as hardware or firmware, or combinations of software, hardware and/or firmware. Additionally, it should be understood that the operations of the mobile device 152 may be provided by fewer, greater, or differently named components.

A mobile device 152 user may use a ride-share application interface 220 connected to a web server 208 to initiate a transaction with the server 206. In one example, a transaction request receipt controller 210 of the server 206 may process the user input received by the web server 208, such as, but not limited to, a user name, pick-up location, destination, payment method, and so on. A device identifier generator 212 may associate a mobile device identifier and a vehicle identifier generator 214 may define a vehicle identifier to be used with a given ride-share request.

A location offset generator 216 of the server 206 may generate a location offset value to be applied during wireless transmissions associated with the current transaction. In an example, the location offset generator 216 may select a random or a pseudo-random number of degrees, minutes, and seconds by which latitude and/or longitude of the vehicle 102 and the mobile device 152 may be offset. In some examples, the location offset value may be determined as a random value between a minimum range from the vehicle (e.g., 100 feet, one mile, etc.) and a maximum range from the vehicle (e.g., ten miles, 100 miles, etc.). In another example, the location offset generator 216 may select a decimal value by which to offset the geographic coordinates converted to a decimal format. In still another example, the location offset generator 216 may select an offset value according to one or more coordinate systems, such as a number line, Cartesian, polar, cylindrical, spherical, homogeneous coordinate systems, and so on. Additionally or alternatively, the location offset may include a plurality of portions to be applied to a plurality of dimensions, such that, for example, a first portion of the offset is to be applied to a first dimension and a second portion different from the first portion is to be applied to a second dimension, and so on. The location offset may further be one of a variety of number types, such as, a whole number, an integer, and so on, and may be positive or negative value or a combination of the two, e.g., a first portion of the offset value is positive and a second portion of the offset is negative. Furthermore, the location offset may be applied to the parameter identifying the geographic location in any of a variety of mathematical operations, such as, but not limited to, addition, subtraction, and so on.

An encryption key generator 218 of the server 206 may define an encryption key and a decryption key to be used by the vehicle 102 and the mobile device 152 in association with the current transaction. The encryption and decryption keys (or cryptographic keys) may each be a string of characters having a predefined length and generated using a random bit generator, derived from another string of characters, derived from a password, derived according to a key agreement between two entities, and so on. In some examples, the cryptographic keys may be keys generated using asymmetric-key algorithms, symmetric-key algorithms, or some combination of the two, such as, but not limited to, Triple Data Encryption Standard (DES) algorithm, RSA, Blowfish, Twofish, Advanced Encryption Standard (AES), and so on. The web server 208 may send instructions 222 to the mobile device 152 and send instructions 252 to the computing platform 104, each including one or more of the encryption key, the mobile device identifier, the vehicle identifier, and the location offset to be used in association with the current transaction. The web server 208 may further send to the vehicle 102 the pick-up location and the destination of the user of the mobile device 152.

Following the receipt of the instructions 252, the computing platform 104 may compare current vehicle 102 location as provided, for instance, by the GPS controller 146 to the pick-up location and may navigate the vehicle 102 to the pick-up location if the current location does not match the desired pick-up location. An authentication controller 238 may send out an encrypted broadcast 240 indicating that a vehicle access may be available to an authorized user. The encrypted broadcast 240 may be secured using the pre-shared encryption key associated with the current transaction and/or include the received vehicle identifier and a current vehicle 102 location offset using the location offset value.

An authentication controller 224 of the mobile device 152 may decrypt the detected broadcast 226 isolating a vehicle identifier 232 and a vehicle location 236. In an example, the authentication controller 224 may reference the decryption key included in the instructions 222 received from the server 206.

An identifier verification controller 230 may compare the vehicle identifier 232 included with the detected broadcast to the vehicle identifier received from the server 206, e.g., via the instructions 222. In response to the detected vehicle identifier 232 corresponding to the vehicle identifier as part of the instructions 222, a location verification controller 234 may compare a vehicle location 236 in the detected broadcast to current location of the mobile device 152. In an example, the location verification controller 234 may reverse application of the location offset as received in the instructions 222 prior to comparing the vehicle location 236 being broadcasted to current location of the mobile device 152. The location of the vehicle 102 may be authenticated in response to the location verification controller 234 detecting that the vehicle 102 is located within a predefined distance threshold of the mobile device 152.

The authentication controller 224 of the mobile device 152 may broadcast an encrypted vehicle 102 access request 228 in response to a successful confirmation of the vehicle identifier and the vehicle 102 location. In an example, the authentication controller 224 may encrypt the request 228 using the encryption key received from the server 206 in association with the current transaction. The request 228 may include, for instance, the mobile device identifier received from the server 206 and current mobile device 152 location as received from a GPS transceiver of the mobile device 152 and further offset using the location offset.

The authentication controller 238 of the vehicle 102 may decrypt a detected vehicle access request 242 using the decryption key of the instructions 252 received from the server 206. An identifier verification controller 244 of the vehicle 102 may compare a detected mobile device identifier 246 with the device identifier of the instructions 252. In response to the received mobile device identifier 246 corresponding to the device identifier stored with the instructions 252, a location verification controller 248 may compare a received mobile device location 250 with current location of the vehicle 102. In an example, the location verification controller 248 may reverse application of the location offset as received in the instructions 252 prior to comparing the received mobile device location 250 with the current vehicle 102 location. The location of the mobile device 152 may be authenticated in response to the location verification controller 248 detecting that the mobile device 152 is located within a predefined distance threshold of the vehicle 102.

The authentication controller 238 of the vehicle 102 may broadcast an access confirmation to the mobile device 152 in response to a successful confirmation of the mobile device identifier and location. In an example, the authentication controller 238 may issue a command to open one or more vehicle 102 doors in response to determining based on, for example, a signal strength of the mobile device 152 that the user is within a predefined distance of the vehicle 102.

Figure 3:
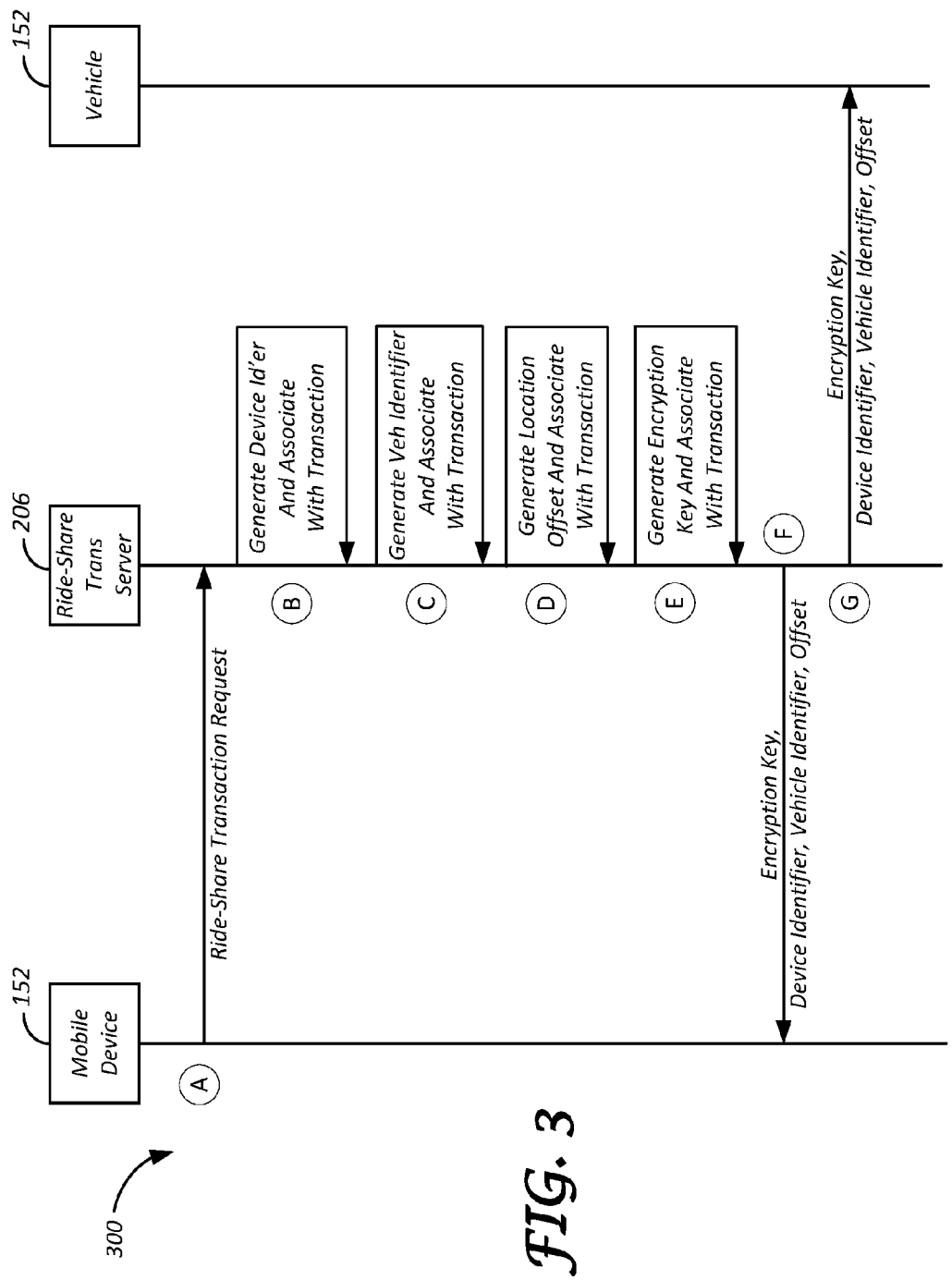
FIG. 3 is a data flow diagram illustrating the generation and distribution of authentication identifiers associated with the ride-share transaction.

FIG. 3 illustrates an example data flow diagram 300 illustrating the generation and distribution of authentication parameters associated with a ride-share transaction. In an example, the data flow may be performed using a system such as illustrated in FIG. 2.

At time index (A), the mobile device 152 sends a ride-share transaction request to the ride-share transaction server 206. A mobile device 152 user may, for example, make a selection indicating a desired pick-up location using the ride-share application interface 220 installed on the mobile device 152. At time index (B), the server 206 generates a device identifier for the mobile device 152 that sent the transaction request and associates the generated device identifier with the current transaction. In an example, the device identifier generator 212 of the server 206 may generate a device identifier using a random number generator algorithm, pseudorandom number generator algorithm operating from a seed value, and so on.

At time index (C), the server 206 generates a vehicle identifier for the vehicle 102 assigned to fulfill the requested service and associates the generated vehicle identifier with the current transaction. The vehicle identifier generator 214 of the server 206 may, for example, generate a vehicle identifier using a random or a pseudorandom number generator algorithm or the like. At time index (D), the server 206 generates a location offset and associates the generated location offset with the current transaction. In one instance, the location offset generator 216 of the server 206 may reference a listing of location offsets stored in the server memory and linked to a plurality of values, e.g., degrees, minutes, seconds, and so on, identifying a change to be applied to the current geographic location of both the vehicle 102 and the mobile device 152.

At time index (E), the server 206 generates an encryption key and associates the generated encryption key with the current transaction. In an example, the encryption key generator 218 of the server 206 may use one of a plurality of key derivation functions to generate one or more encryption keys having a predefined length. At time index (F), the server 206 sends instructions 222 including the device identifier, the vehicle identifier, the location offset, and the encryption key associated with the current transaction to the mobile device 152. The web server 208 of the server 206, for instance, may communicate with the processor 162 of the mobile device 152 and may indicate the device identifier, the vehicle identifier, the location offset, and the encryption key to be used to communicate with the vehicle 102 to request access to the vehicle 102.

At time index (G), the server 206 sends instructions 252 including the device identifier, the vehicle identifier, the location offset, and the encryption key associated with the current transaction to the vehicle 102. In an example, the web server 208 may communicate with the vehicle 102 computing platform 104 and may indicate that the device identifier, the vehicle identifier, the location offset, and the encryption key are to be used to communicate with the mobile device 152 to grant access to the vehicle 102. The instructions 252 provided by the web server 208 of the server 206 may further include a pick-up location associated with the current transaction, such as, but not limited to, a current location of the mobile device 152 user.

Figure 4:
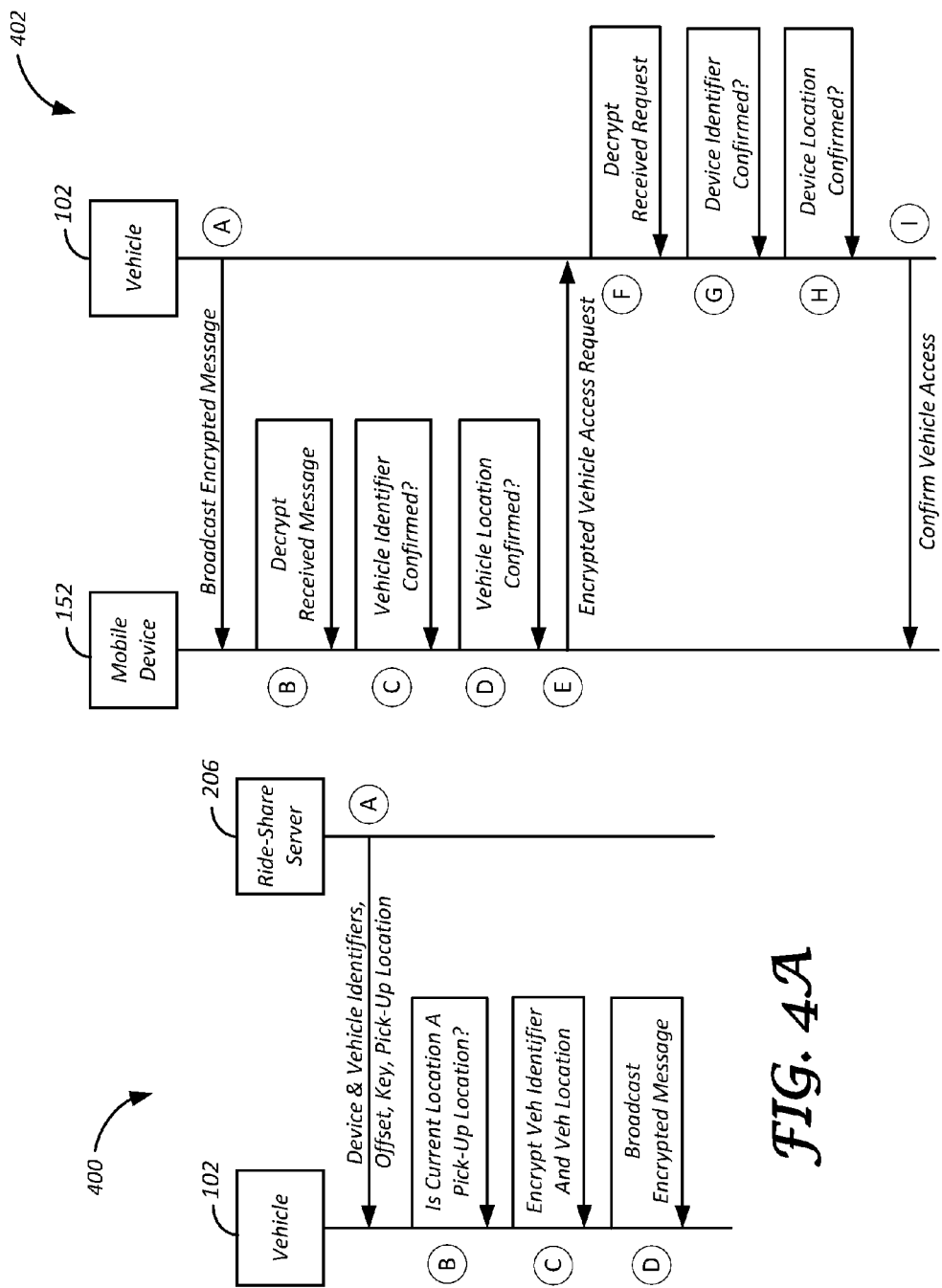
FIG. 4A is a data flow diagram illustrating the broadcasting an encrypted message indicating availability of access to the vehicle.
FIG. 4B is a data flow diagram illustrating the authentication of the vehicle and the mobile device for granting access to the vehicle.

In reference to FIG. 4A, an example data flow diagram 400 illustrating broadcasting an encrypted message indicating the vehicle 102 access availability. At time index (A), the web server 208 sends to the vehicle 102 the instructions 252 including the pick-up location, the device identifier, the vehicle identifier, the location offset, and the encryption key to be used to grant access to the vehicle 102 in association with a given transaction.

At time index (B), the computing platform 104 detects whether current location of the vehicle 102 corresponds to the pick-up location associated with the transaction and received from the server 206. The computing platform 104 may, in an example, compare location information received from the GPS controller 146 of the vehicle 102 to the pick-up location specified by the server 206. In another example, the computing platform 104 may determine that the vehicle 102 is at the pick-up location associated with the current transaction in response to detecting that location of the vehicle 102 is within a predefined distance threshold, e.g., one or more yards, feet, meters, and so on, of the pick-up location. As the location of the vehicle 102 changes, the computing platform 104 may continue to query the GPS controller 146 to determine whether the new location corresponds to the pick-up location.

At time index (C), in response to detecting that current location of the vehicle 102 corresponds to the pick-up location associated with the transaction, the computing platform 104 encrypts parameters associated with the current transaction prior to broadcasting the encrypted message. In an example, the computing platform 104 may use the encryption key received from the server 206 in association with current transaction to encrypt the vehicle identifier. The computing platform 104 may, in another example, include in the encrypted message the current vehicle 102 location received from the GPS controller 146. In still another example, the computing platform 104 may offset current location of the vehicle 102 using the location offset received from the server 206 in association with the current transaction prior to broadcasting the encrypted message.

At time index (D), the computing platform 104 broadcasts an encrypted message indicating that access to the vehicle 102 may be available. In an example, the computing platform 104 may control (e.g., tune according to customer selected preferences and/or according to instructions to the processor 106, and so on) a range of the broadcast to be within a predefined distance from the current location of the vehicle 102. The computing platform 104 may, for example, control signal strength of the BLE advertisement to be in a range of 100 feet.

In reference to FIG. 4B, an example data flow diagram 402 illustrating the vehicle 102 and mobile device 152 authentication for requesting and granting access to the vehicle 102. In an example, the data flow 402 may be performed following one or more data flows such as illustrated in FIG. 4A.

At time index (A), the computing platform 104 of the vehicle 102 broadcasts, such as via a BLE advertisement, an encrypted message indicating that access to the vehicle 102 may be available. At time index (B), the mobile device 152 decrypts the detected broadcast 226. The authentication controller 224 of the mobile device 152 may, for example, decrypt the detected broadcast 226 using the decryption key received in association with the current transaction, such as included with the instructions 222. Following decryption of the detected broadcast 226, the mobile device 152 may, in an example, isolate the vehicle identifier 232 and location 236 of the broadcasting vehicle 102. In one instance, the authentication controller 224 may determine location 236 of the broadcasting vehicle 102 by a reversely applying the location offset received from the server 206 in association with the current transaction.

At time index (C), the mobile device 152 determines whether the vehicle identifier 232 advertised by the broadcasting vehicle 102 corresponds to the vehicle identifier received from the server 206 in association with the current transaction. In an example, the identifier verification controller 230 of the mobile device 152 may reference the vehicle identifier received from the server 206 in the instructions 222 and stored in the memory 164.

At time index (D), the mobile device 152 determines whether the location 236 included in the detected broadcast from the vehicle 102 corresponds to the current location of the mobile device 152. In an example, the location verification controller 234 may compare the current mobile device 152 location reported by a GPS transceiver of the mobile device 152 and the location 236 isolated from the encrypted message received from the broadcasting vehicle 102. The location verification controller 234 may, for instance, determine that the location 236 of the broadcasting vehicle 102 corresponds to the current location of the mobile device 152 in response to detecting that a difference between the location 236 and the current location of the mobile device 152 is less than a predefined distance threshold.

At time index (E), in response to confirming the vehicle identifier and the location of the vehicle 102, the mobile device 152 broadcasts a vehicle access request 228. In an example, prior to the broadcasting, the authentication controller 224 of the mobile device 152 may encrypt the broadcasted vehicle access request 228 using an encryption key received from the server 206 in association with current transaction. The encrypted vehicle access request 228 may include one or more of the device identifier and the mobile device 152 location received from the GPS transceiver and offset using the location offset value.

At time index (F), the vehicle 102 decrypts the detected vehicle 102 access request 242. In an example, the authentication controller 238 of the vehicle 102 may decrypt the detected vehicle access request 242 using the decryption key received from the server 206 in association with the current transaction, such as the decryption key included with the instructions 252. Following decryption of the detected request 242, the vehicle 102 may, in an example, isolate the mobile device identifier 246 and location 250 of the mobile device 152 requesting access. In one instance, the authentication controller 238 may determine the reported mobile device 152 location 250 by reversely applying the location offset received from the server 206 in association with the current transaction.

At time index (G), the vehicle 102 detects whether the device identifier 246 broadcasted by the mobile device 152 corresponds to the device identifier received from the server 206 in association with the current transaction. In an example, the identifier verification controller 244 of the vehicle 102 may reference the device identifier received from the server 206 in the instructions 252 and stored in the memory 108.

At time index (H), the vehicle 102 determines whether the location 250 being broadcasted by the mobile device 152 corresponds to the current location of the vehicle 102. In an example, the location verification controller 248 may compare the current vehicle 102 location reported by the GPS controller 146 and the location 250 isolated from the detected vehicle 102 access request. The location verification controller 248 may, for instance, determine that the location 250 of the mobile device 152 as interpreted from the detected broadcast corresponds to the current vehicle 102 location in response to detecting that a difference between the location 250 and the current location of the vehicle 102 is less than a predefined distance threshold.

At time index (I), upon confirmation of the device identifier and the location of the mobile device 152, the vehicle 102 broadcasts access confirmation to the vehicle 102. In an example, the authentication controller 238 may broadcast a notification indicating that the requested access to the vehicle 102 has been granted to the user of the authenticated mobile device 152.

Figure 5:
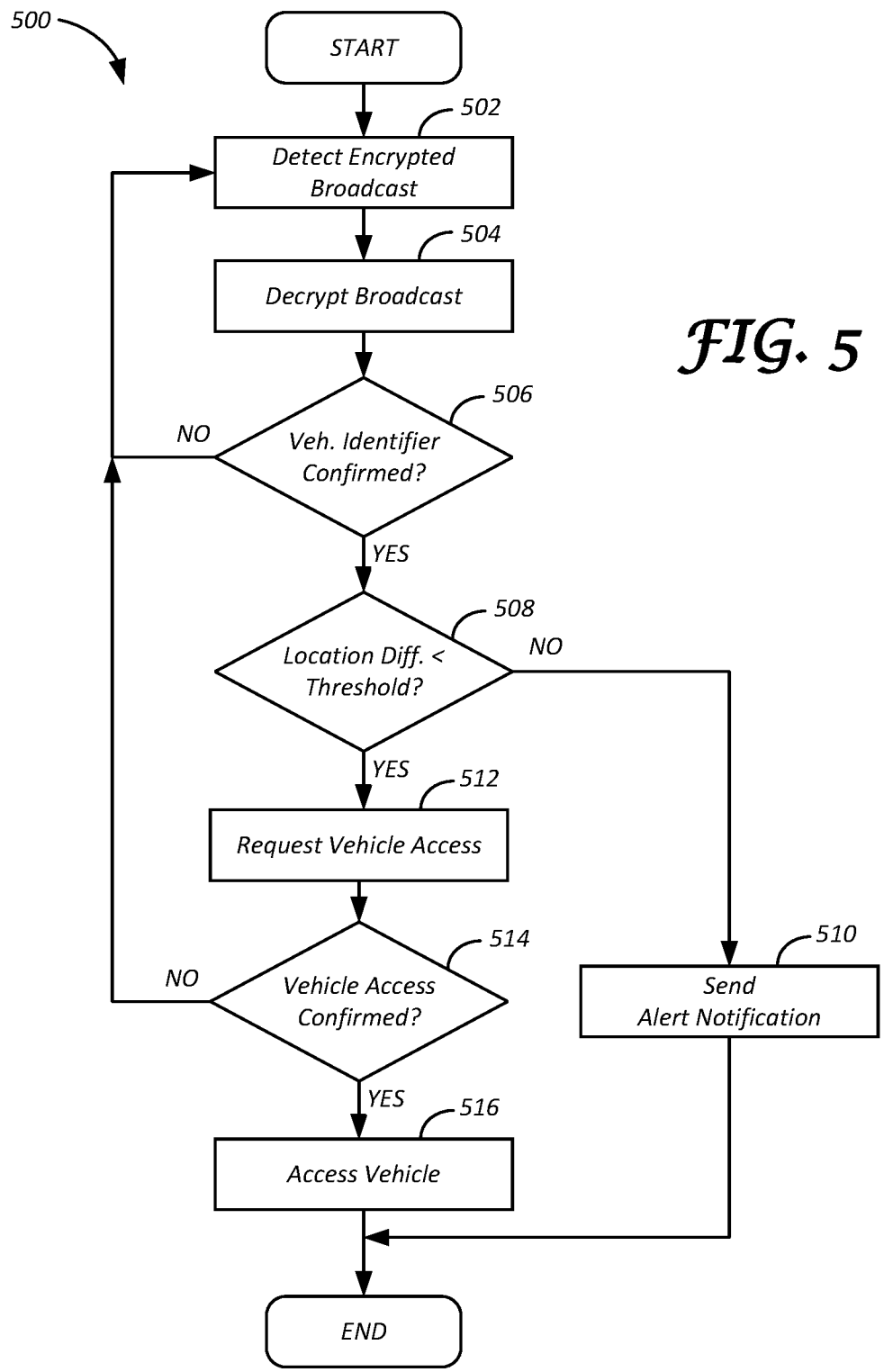
FIG. 5 is a flowchart illustrating an algorithm for authenticating a vehicle broadcast and requesting access to the vehicle.

FIG. 5 illustrates an example process 500 for requesting access to the vehicle 102. The process 500 may be performed, for example, by the processor 162 of the mobile device 152 in communication with the vehicle 102 over the wide-area network 156.

At operation 502, the mobile device 152 detects an encrypted broadcast delivered, for instance, via a BLE advertisement. The mobile device 152, at operation 504, decrypts the detected broadcast 226. In an example, the authentication controller 224 of the mobile device 152 may decrypt the detected broadcast 226 using the decryption key received from the server 206 in association with the current transaction, e.g., included with the instructions 222. As part of or upon completion of the decryption process, the mobile device 152 may identify within the detected broadcast 226 the vehicle identifier 232 and the location 236 of the broadcasting vehicle 102. In one instance, the authentication controller 224 may determine location 236 of the broadcasting vehicle 102 by a reversely applying the location offset received from the server 206 in association with the current transaction.

At operation 506, the mobile device 152 determines whether the vehicle identifier 232 being broadcasted by the broadcasting vehicle 102 corresponds to the vehicle identifier received from the server 206 in association with the current transaction. Upon determining that the vehicle identifier 232 does not correspond to the vehicle identifier associated with the current transaction, control may pass to operation 502.

Following a confirmation that the vehicle identifier stored in association with the current transaction corresponds to the broadcasting vehicle 102 vehicle identifier 232, the mobile device 152 determines, at operation 508, whether the location 236 broadcasted by the vehicle 102 corresponds to the current location of the mobile device 152. In an example, the location verification controller 234 may compare the current mobile device 152 location reported by the GPS transceiver of the mobile device 152 and the location 236 isolated from the detected broadcast of the broadcasting vehicle 102. In another example, the location verification controller 234 may determine that the location 236 of the broadcasting vehicle 102 corresponds to the current location of the mobile device 152 in response to detecting that a difference between the location 236 and the current location of the mobile device 152 is less than a predefined distance threshold.

Upon determining that the difference between the current location 236 of the vehicle 102 and that of the mobile device 152 is greater than a predefined distance threshold, e.g., the vehicle 102 and the mobile device 152 are several hundred feet apart, the mobile device 152, at operation 510, broadcasts a notification indicating that messages from the vehicle 102 are being falsified or otherwise manipulated.

At operation 512, in response to confirming the vehicle identifier and the location of the vehicle 102, the mobile device 152 broadcasts a vehicle access request 228. In an example, prior to broadcasting, the mobile device 152 may encrypt the vehicle access request 228 using an encryption key received from the server 206 in association with current transaction, as described in reference to FIG. 4B. The encrypted vehicle access request 228 may include one or more of the device identifier and the mobile device 152 location offset using the location offset received from the server 206 in association with the current transaction.

The mobile device 152 determines, at operation 514, whether the requested vehicle access has been confirmed by the vehicle 102. The processor 162 may, for example, wait a predefined amount of time for access confirmation to be broadcasted by the vehicle 102 and, if the confirmation is not received, the control may pass to operation 502.

At operation 516, a user of the mobile device 152 accesses the vehicle 102 following the receipt of a confirmation that access to the vehicle 102 has been granted. The use of the mobile device 152 may, in an example, request the vehicle 102 to indicate which vehicle door they should use to access their reserved seat in association with the current transaction. In another example, following the broadcasting of access confirmation, the vehicle 102 may permit door lock actuation when the mobile device 152 is less than a predefined distance, e.g., several feet, from the vehicle 102. In some examples, the vehicle 102 may permit door lock actuation to the mobile device 152 based on an ability to receive a low-power signal from the vehicle 102.

Figure 6:
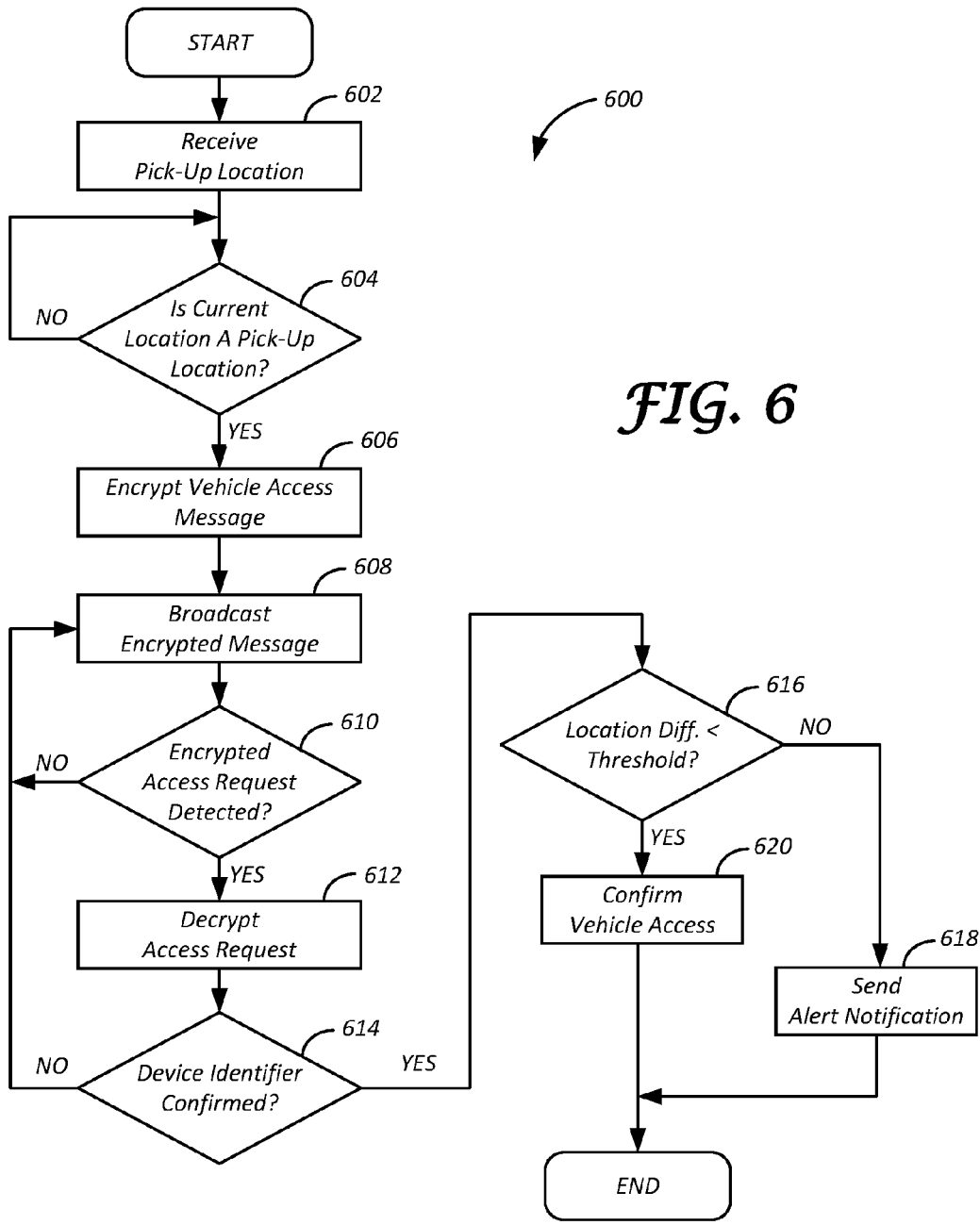
FIG. 6 is a flowchart illustrating an algorithm for authenticating and granting a vehicle access request.

FIG. 6 illustrates an example process 600 for processing a request to access the vehicle 102. The process 600 may be performed, for example, by the computing platform 104 of the vehicle 102 in communication with the mobile device 152 over the wide-area network 156.

At operation 602, the computing platform 104 receives the pick-up location in association with the current transaction. In an example, the computing platform 104 may receive from the server 206 the instructions 252 including the pick-up location, the device identifier, the vehicle identifier, the location offset, and the encryption key to be used to grant access to the vehicle 102 in association with the current transaction.

At operation 604, the computing platform 104 determines whether current location of the vehicle 102 corresponds to the pick-up location received from the server 206. The computing platform 104 may, in an example, compare location information received from the GPS controller 146 of the vehicle 102 to the pick-up location specified by the server 206. Furthermore, as the location of the vehicle 102 changes, the computing platform 104 may continue to query the GPS controller 146 to determine whether the new location corresponds to the pick-up location.

At operation 606, in response to detecting that current location of the vehicle 102 corresponds to the pick-up location associated with the transaction, the computing platform 104 encrypts parameters associated with the current transaction, such as the vehicle identifier and current vehicle 102 location, prior to broadcasting the encrypted BLE advertisement. In an example, the computing platform 104 may encrypt the one or more parameters using the encryption key received from the server 206 in association with current transaction. The computing platform 104 may, in another example, offset current location of the vehicle 102 using the location offset received from the server 206 in association with the current transaction prior to encrypting the broadcast.

The computing platform 104, at operation 608, broadcasts the encrypted message indicating that access to the vehicle 102 may be available. In an example, the computing platform 104 may control a range of the broadcast to be within a predefined distance from the current location of the vehicle 102. The computing platform 104 may, for example, control signal strength of the BLE advertisement to be in a range of a hundred feet.

At operation 610, the computing platform 104 may determine whether a broadcast including an encrypted access request has been detected. The computing platform 104, in one example, may wait a predefined period of time following the broadcasting of the encrypted BLE advertisement prior to determining whether a broadcast including an access request has been detected. In response to determining, at operation 610, that the access request has not been detected, the control may return to the operation 608 where the computing platform 104 broadcasts an encrypted BLE advertisement.

In response to detecting a broadcasted access request from the mobile device 152, the computing platform 104, at operation 612, decrypts the detected request 242 using the decryption key associated with the current transaction. Following the decryption of the detected request 242, the vehicle 102 may isolate the mobile device identifier 246 and location 250 of the mobile device 152 broadcasting the request. The computing platform 104 may, in an example, determine the location 250 of the broadcasting mobile device 152 by reversely applying the location offset value received from the server 206 in association with the current transaction.

At operation 614, the computing platform 104 determines whether the device identifier 246 included in the detected broadcast corresponds to the device identifier received from the server 206 in association with the current transaction. In an example, the identifier verification controller 244 of the vehicle 102 may reference the device identifier received from the server 206 in the instructions 252 and stored in the memory 108.

The computing platform 104 determines, at operation 616, whether the location 250 of the broadcasting mobile device 152 corresponds to the current location of the vehicle 102. In an example, the computing platform 104 may determine that the location 250 of the mobile device 152 corresponds to the current vehicle 102 location in response to detecting that a difference between the location 250 and the current location of the vehicle 102 is less than a predefined distance threshold. In response to the computing platform 104 determining that the location 250 of the mobile device 152 requesting access is greater than a predefined distance threshold, the computing platform 104 sends out a notification, at operation 618, indicating that messages from the mobile device 152 are being falsified or otherwise manipulated.

Upon confirmation of the device identifier and the location of the mobile device 152, the computing platform 104, at operation 620, broadcasts an access confirmation to the vehicle 102. In an example, the computing platform 104 may broadcast a notification to the mobile device 152 indicating that the requested access to the vehicle 102 has been granted.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system comprising: a controller of a vehicle, configured to: responsive to location information received from a positioning system indicating a vehicle location corresponding to a predefined location, offset the vehicle location using a pre-shared location offset, generated by a location offset generator, and broadcast a notification including the vehicle location as offset, and responsive to receiving a request including a device location from a mobile device having interpreted the broadcast, permit access to the vehicle responsive to a difference between the device location and the vehicle location being less than a predefined threshold distance.

2. The system of claim 1, wherein the pre-shared location offset is an offset value received from a remote server responsive to a ride-share request received by the server from the mobile device.

3. The system of claim 1, wherein the controller is further configured to use the pre-shared location offset to reverse a location offset applied to the device location by the mobile device to determine the difference.

4. The system of claim 1, wherein the request further includes a device identifier and wherein the controller is further configured to additionally authenticate the device identifier to permit the access to the vehicle.

5. The system of claim 1, wherein the controller is further configured to:
encrypt the as broadcast notification using an encryption key; and
permit access responsive to receiving the request from the mobile device having decrypted the broadcast.

6. The system of claim 5, wherein the controller is further configured to receive the encryption key from a remote server responsive to a ride-share request received by the server from the mobile device.

7. The system of claim 1, wherein the predefined location is a pick-up location of a ride-share request sent by the mobile device.

8. A method comprising: responsive to a vehicle located at a pick-up location, offsetting the vehicle location using a pre-shared location offset, generated by a location offset generator, and broadcasting an encrypted combination of an identifier and the offset location; and responsive to receiving an encrypted request including both an identifier and a location of a mobile device receiving the broadcast, decrypting the request and permitting access to the vehicle responsive to the device location being within a predefined distance to the pick-up location.

9. The method of claim 8 further comprising reversing, using the pre-shared location offset, a location offset applied to the device location by the mobile device for comparing the vehicle and device locations.

10. The method of claim 9, wherein the pre-shared location offset is an offset value received from a remote server responsive to a ride-share request received by the server from the mobile device.

11. The method of claim 8, wherein the established pick-up location is based on a ride-share request received by a remote server from the mobile device.

12. The method of claim 8, wherein the encrypted combination is encrypted using an encryption key received from a remote server responsive to a ride-share request received by the server from the mobile device.

13. The method of claim 8 further comprising decrypting the request using a decryption key received from a remote server responsive to a ride-share request received by the server from the mobile device.

14. A system comprising: a mobile device configured to: responsive to receiving, from a vehicle, an access notification indicating that access to the vehicle is available, send to the vehicle an access request including both a device identifier and device location according to location information received from a device positioning system offset generator using a predefined offset value, and responsive to receiving an access confirmation from the vehicle having interpreted the request, display a confirmation notification.

15. The system of claim 14, wherein the receiving of the access confirmation from the vehicle is responsive to a difference between the device location and a vehicle location identified according to a positioning system of the vehicle being less than a predefined threshold distance.

16. The system of claim 14, wherein the access notification is responsive to a ride-share request sent by the mobile device.

17. The system of claim 14, wherein the access notification further includes a vehicle location and wherein the mobile device is further configured to send the access request responsive to the vehicle location being within a predefined threshold distance of a pick-up location associated with a ride-share request sent by the mobile device.

18. The system of claim 1, wherein the pre-shared location offset includes one of a random and a pseudo-random number of degrees, minutes, and seconds by which to offset at least one of latitude and longitude of the vehicle location.

19. The system of claim 1, wherein the pre-shared location offset includes a random value between a predefined minimum range and a predefined maximum range from the vehicle.

20. The system of claim 1, wherein the pre-shared location offset includes a decimal value by which to offset a decimal equivalent of geographic coordinates of the vehicle location.

* * * * *